US011448327B2

(12) United States Patent
Heffner et al.

(10) Patent No.: US 11,448,327 B2
(45) Date of Patent: Sep. 20, 2022

(54) VALVE FOR SINGLE-USE APPLICATIONS

(71) Applicant: Equlibar, LLC, Fletcher, NC (US)

(72) Inventors: Ryan Heffner, Asheville, NC (US); Jeffrey D. Jennings, Hendersonville, NC (US); David A. Reed, Hendersonville, NC (US); Tony B. Tang, Asheville, NC (US)

(73) Assignee: Equilibar, LLC, Fletcher, NC (US)

( * ) Notice: Subject to any disclaimer, the term of this patent is extended or adjusted under 35 U.S.C. 154(b) by 0 days.

(21) Appl. No.: 17/394,788

(22) Filed: Aug. 5, 2021

(65) Prior Publication Data

US 2021/0364095 A1 Nov. 25, 2021

Related U.S. Application Data

(63) Continuation of application No. 16/762,021, filed as application No. PCT/US2018/059431 on Nov. 6, 2018, now abandoned.

(60) Provisional application No. 62/582,601, filed on Nov. 7, 2017.

(51) Int. Cl.
*F16K 7/12* (2006.01)
*F16K 15/14* (2006.01)
*F16K 27/02* (2006.01)

(52) U.S. Cl.
CPC ............ *F16K 7/123* (2013.01); *F16K 15/144* (2013.01); *F16K 27/0236* (2013.01)

(58) Field of Classification Search
CPC ...... F16K 7/17; F16K 15/1402; F16K 15/144; F16K 15/145; F16K 247/0236; F16K 247/0281; F16K 31/1266
See application file for complete search history.

(56) References Cited

U.S. PATENT DOCUMENTS

| 3,083,943 A | 4/1963 | Stewart, Jr. et al. |
| 3,856,046 A | 12/1974 | Brown et al. |
| 4,168,724 A | 9/1979 | Graffunder et al. |

(Continued)

FOREIGN PATENT DOCUMENTS

| FR | 1375258 | 10/1964 |
| GB | 1404941 | 9/1975 |

(Continued)

OTHER PUBLICATIONS

International Search Report and Written Opinion dated Jan. 18, 2019 for related International Patent Application No. PCT/US2018/059431.

*Primary Examiner* — Hailey K. Do
(74) *Attorney, Agent, or Firm* — Trego, Hines & Ladenheim, PLLC; Jonathan M. Hines

(57) ABSTRACT

A centerbody assembly for a valve includes: a centerbody having a process surface, at least one inlet orifice disposed in the centerbody and adapted to be disposed in fluid communication with a fluid at a process pressure, and at least one outlet orifice disposed in the centerbody separate from the at least one inlet orifice; an inlet port disposed in fluid communication with the at least one inlet orifice; an outlet port disposed in fluid communication with the at least one outlet orifice; and a flexible control diaphragm facing the process surface, wherein a perimeter of the control diaphragm is bonded to the centerbody so as to define a seal that blocks the passage of fluid.

12 Claims, 11 Drawing Sheets

(56) References Cited

U.S. PATENT DOCUMENTS

| | | | |
|---|---|---|---|
| 4,846,215 A | | 7/1989 | Barree |
| 4,858,883 A | * | 8/1989 | Webster ................ F16K 11/022 |
| | | | 137/884 |
| 5,265,645 A | * | 11/1993 | Goodwin ............ F16K 17/0453 |
| | | | 137/859 |
| 5,386,848 A | * | 2/1995 | Gilchrist ............... F16K 15/144 |
| | | | 137/315.33 |
| 5,496,009 A | | 3/1996 | Farrell et al. |
| 5,762,314 A | | 6/1998 | Williams |
| 6,196,521 B1 | | 3/2001 | Hynes et al. |
| 2009/0242045 A1 | | 10/2009 | Jennings |
| 2009/0242818 A1 | * | 10/2009 | Leys ................... F16K 27/0236 |
| | | | 251/332 |

FOREIGN PATENT DOCUMENTS

| | | | | |
|---|---|---|---|---|
| WO | WO-9220942 A1 | * | 11/1992 | ............... F16K 7/17 |
| WO | 2005010418 | | 2/2005 | |

* cited by examiner

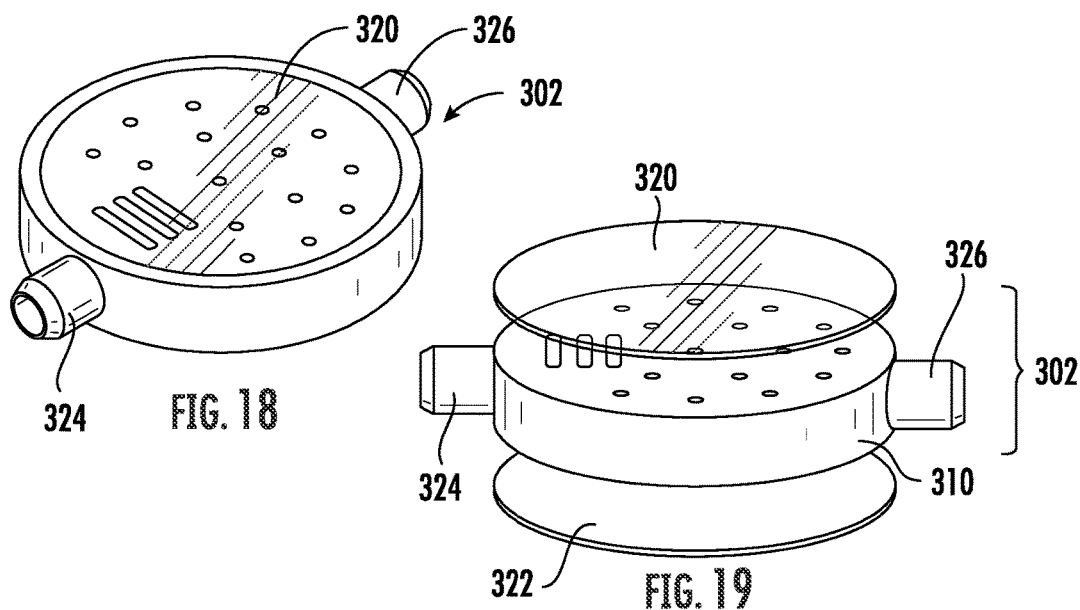
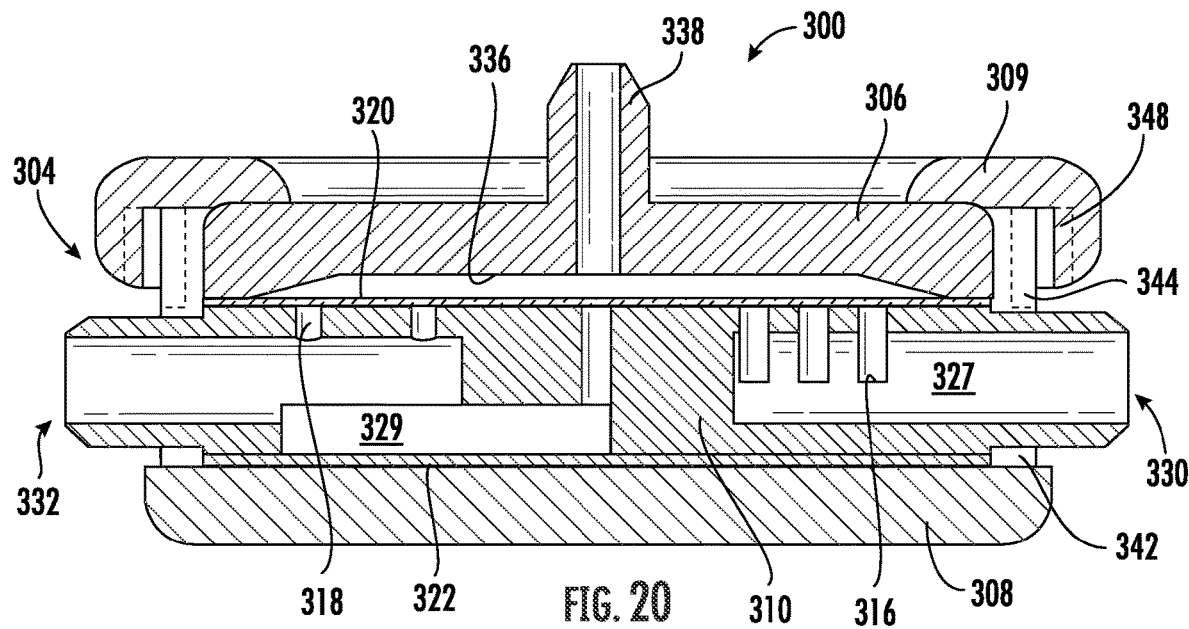

VALVE FOR SINGLE-USE APPLICATIONS

BACKGROUND OF THE INVENTION

The present invention relates to valves, and more particularly to valves which are suitable for single-use applications.

Chemical and biological manufacturing processes typically require complex piping systems to route fluids between and among equipment such as storage vessels, reactors, distillation columns, and the like. These piping systems typically include multiple conduits, couplings regulators, and valves.

In such processes, there is a need for fluid control valves and on/off valves to control process pressure over wide pressure ranges, such as from 0.1 bar to 10 bar, while also controlling across wide flow ranges (wider than traditional control valves, which are approximately 20:1) such as 50:1 or 100:1 flow range ratios. There is also a need for sensitive flow control valves that work well with computer automation and function across wide flow rate ranges (greater than traditional control valves).

Furthermore, in certain industries, especially bio-pharmaceutical manufacturing, there is a desire to reduce overhead costs associated with cleaning and validation of a sterile work environment.

One problem with existing pressure regulators and similar valves is that they must be capable of maintaining sterile conditions while also resisting operating pressures. This drives them to be manufactured from heavy, expensive materials such as stainless steel which can be sterilized or re-sterilized (e.g., through autoclave processes). This need must also balance against the requirement to provide pressure control with high accuracy in certain biopharma processes, such as media filtration.

BRIEF SUMMARY OF THE INVENTION

This problem is addressed by a valve of the type using a direct-sealing diaphragm. Described herein are several embodiments of this type of valve which are especially suitable for single-use or disposal after use, incorporating one or more features to maintain sterility and minimize waste.

According to one aspect of the technology described herein, a centerbody assembly for a valve includes: a centerbody having a process surface, at least one inlet orifice disposed in the centerbody and adapted to be disposed in fluid communication with a fluid at a process pressure, and at least one outlet orifice disposed in the centerbody separate from the at least one inlet orifice; an inlet port disposed in fluid communication with the at least one inlet orifice; an outlet port disposed in fluid communication with the at least one outlet orifice; and a flexible control diaphragm facing the process surface, wherein a perimeter of the control diaphragm is bonded to the centerbody so as to define a seal that blocks the passage of fluid.

According to another aspect of the technology described herein, a valve comprises: a centerbody assembly including: a centerbody having a process surface, at least one inlet orifice disposed in the centerbody and adapted to be disposed in fluid communication with a fluid at a process pressure, and at least one outlet orifice disposed in the centerbody separate from the at least one inlet orifice; a flexible control diaphragm positioned facing the process surface, wherein a perimeter of the control diaphragm is bonded to the centerbody so as to define a seal that blocks the passage of fluid; an inlet port disposed in fluid communication with the at least one inlet orifice; and an outlet port disposed in fluid communication with the at least one outlet orifice; and an enclosure assembly including a top cap adapted to be disposed in fluid communication with a fluid at a predetermined reference pressure, wherein the control diaphragm is positioned between the centerbody and the top cap, and arranged such that, when the reference pressure is higher than the process pressure the diaphragm is engaged with the at least one outlet orifice, and when the process pressure is higher than the reference pressure, the diaphragm is not engaged with the at least one outlet orifice.

According to another aspect of the technology described herein a valve, comprises: a centerbody having a process surface and an opposed back surface, at least one inlet orifice passing through the centerbody from the process surface to the back surface, and at least one outlet orifice passing through the centerbody from the process surface to the back surface; a flexible control diaphragm disposed adjacent the process surface, wherein a perimeter of the control diaphragm is bonded to the centerbody so as to define a seal that blocks the passage of fluid; a backside diaphragm disposed adjacent the back surface, wherein a perimeter of the backside diaphragm is bonded to the centerbody so as to define a seal that blocks the passage of fluid, the backside diaphragm further being bonded to the back surface so as to separate the inlet orifices from the outlet orifices on the back surface, and wherein the backside diaphragm includes an inlet opening and an outlet opening; and a top cap enclosing the control diaphragm, wherein a periphery of the top cap is bonded to at least one of the control diaphragm and the centerbody, and the top cap includes a reference port connected in fluid communication with a reference cavity defined between the top cap and the control diaphragm.

BRIEF DESCRIPTION OF THE DRAWINGS

The invention may be best understood by reference to the following description taken in conjunction with the accompanying drawing figures in which:

FIG. 18 is a perspective view of a centerbody assembly of the valve of FIG. 13 incorporating the centerbody of FIG. 14;

FIG. 19 is an exploded view of the centerbody assembly of FIG. 18;

FIG. 20 is a cross-sectional view of the assembled valve of FIG. 14;

DETAILED DESCRIPTION OF THE INVENTION

Figure 1:
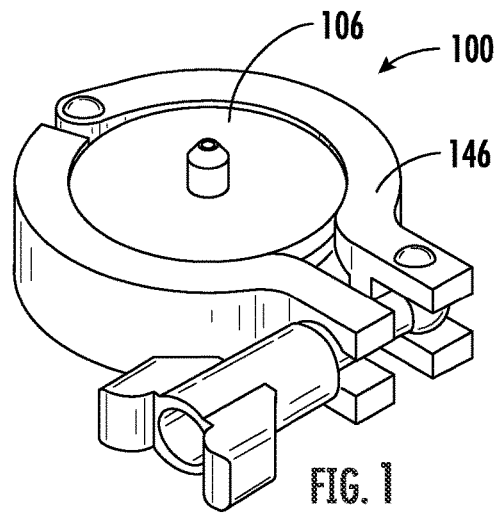
FIG. 1 is a top perspective view showing an exemplary embodiment of a valve.
Figure 2:
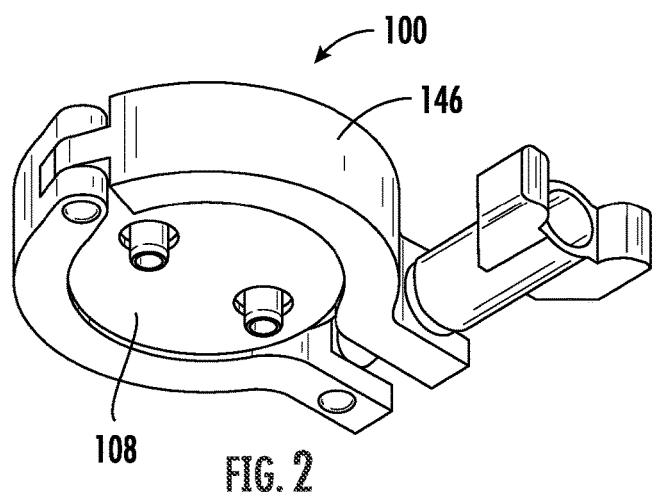
FIG. 2 is a bottom perspective view of the valve shown in FIG. 1.
Figure 3:
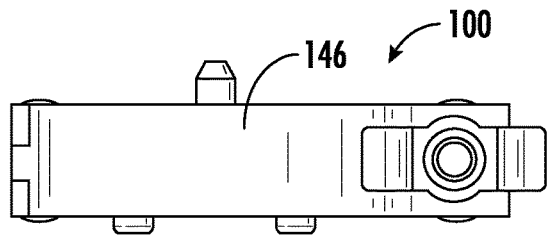
FIG. 3 is a front elevation view of the valve shown in FIG. 1.
Figure 4:
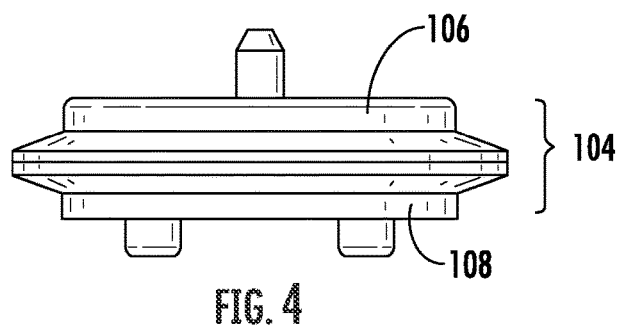
FIG. 4 is a front elevation view of the valve shown in FIG. 1, with a clamp thereof removed.

Now, referring to the drawings wherein identical reference numerals denote the same elements throughout the various views, FIGS. 1-5 illustrate an exemplary valve 100 constructed according to one aspect of the present invention. It is noted that the basic construction described herein can serve as a back pressure regulator or a flow control valve, though "valve" will be referenced in this document for both functions.

Figure 9:
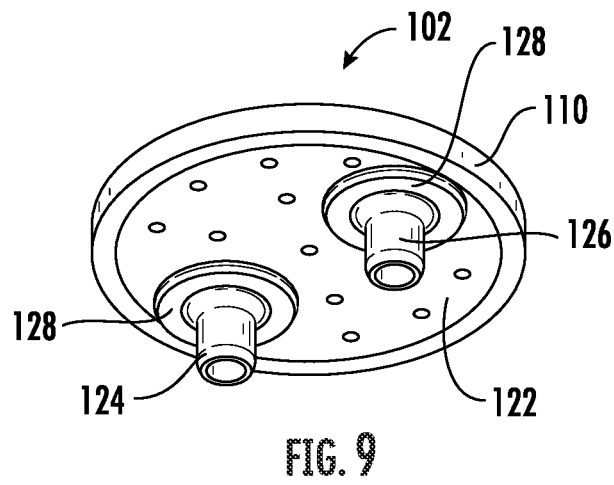
FIG. 9 is a bottom perspective view of the centerbody assembly shown in FIG. 8.

The basic components of the valve 100 are a centerbody assembly 102 (FIG. 9) and an enclosure assembly 104 including a top cap (or reference cap) 106 and a bottom support 108.

The centerbody assembly 102 includes a centerbody 110 having a first side defining a process surface 112, and an opposed second side defining a back surface 114. Both of the surfaces 112, 114 are generally planar in the illustrated example, but different geometries may be used, for example, the surfaces 112, 114 may include various recesses or protrusions.

At least one inlet orifice 116 passes through the centerbody 110 from the process surface 112 to the back surface 114. The function of the inlet orifice (or orifices) 116 is to bring the process fluid into the valve 100. At least one outlet orifice 118 passes through the centerbody 110 from the process surface 112 to the back surface 114. The function of the outlet orifice (or orifices) 118 is to vent process fluid from the valve 100.

The centerbody 110 (containing the orifices) may be manufactured using various methods such as machining from a block of precursor material, additive manufacturing processes (e.g., "3-D printing"), or molding from a polymer suitable for the application requirements. For best performance in a single-use application where sterility is important, a polymer with USP class VI certification may be used. Nonlimiting examples of such materials include polyolefin (e.g., polyethylene, LDPE, HDPE, UHMWPE), PEEK, acetal polymer (e.g. DELRIN), PTFE, and PFA.

A flexible control diaphragm or membrane 120 is disposed adjacent the process surface 112. For best performance in a single-use application where sterility is important, the control diaphragm 120 may be made from a material with USP class VI certification. Nonlimiting examples of such materials include TPU, TPE, polyolefin (LDPE, HDPE, UHMWPE, PP, etc.), PEEK, PTFE, PFA, FEP, a sulfone polymer such as RADEL, silicone, or other similar thermoplastic elastomer such as SANTOPRENE.

The control diaphragm 120 has opposed sides, referred to as reference and process sides, with the process side facing the process surface 112. The perimeter of the control diaphragm 120 is sealed to the centerbody 110. As used herein, the term "sealed" implies that a boundary is present that blocks the passage of fluid, with the understanding that such boundary is not required to resist any specific magnitude of pressure differential. Rather, the seal is for the purpose of ensuring that the control diaphragm 120 is in the correct position and secured in robust enough manner to stay in place and maintain sterility during shipping and assembly.

Some nonlimiting examples of methods of creating a suitable seal include bonding methods, such as thermal bonding, sonic bonding, or adhesive bonding. Other options for sealing the control diaphragm 120 to the centerbody 110 include mechanical seals. Some examples of mechanical seals are illustrated in FIGS. 22-24.

Figure 22:
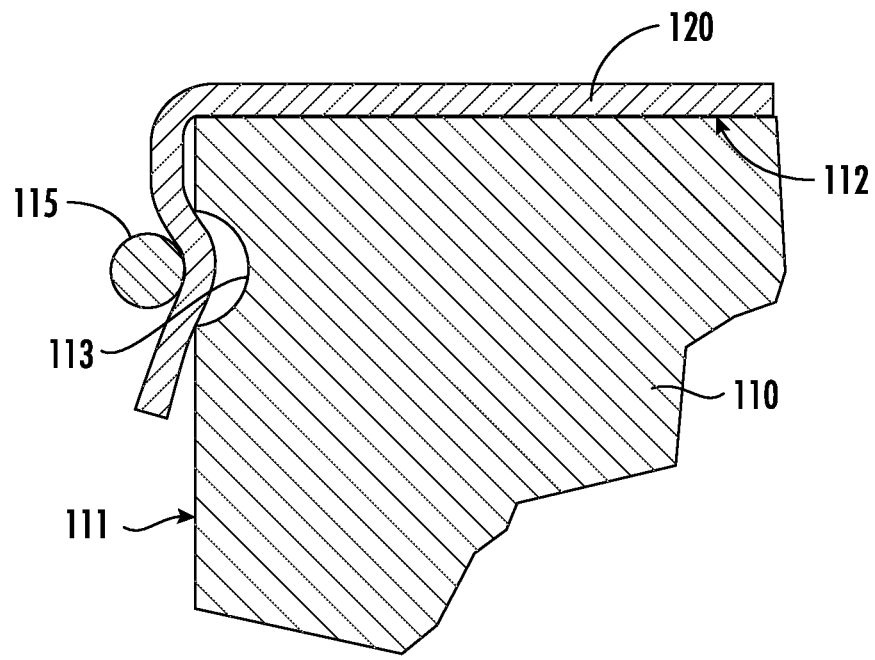
FIG. 22 is a sectional view of a portion of a centerbody showing one configuration of mechanical sealing of a diaphragm.

FIG. 22 shows a control diaphragm 120 placed over the process surface 112 of the centerbody 110, with a portion of the control diaphragm 120 draped over a peripheral wall 111 of the centerbody 110. A shallow concave peripheral groove 113 is formed in the peripheral wall 111. A resilient seal 115 such as the illustrated O-ring surrounds the control diaphragm 120 and forces it into the peripheral groove 113.

Figure 23:
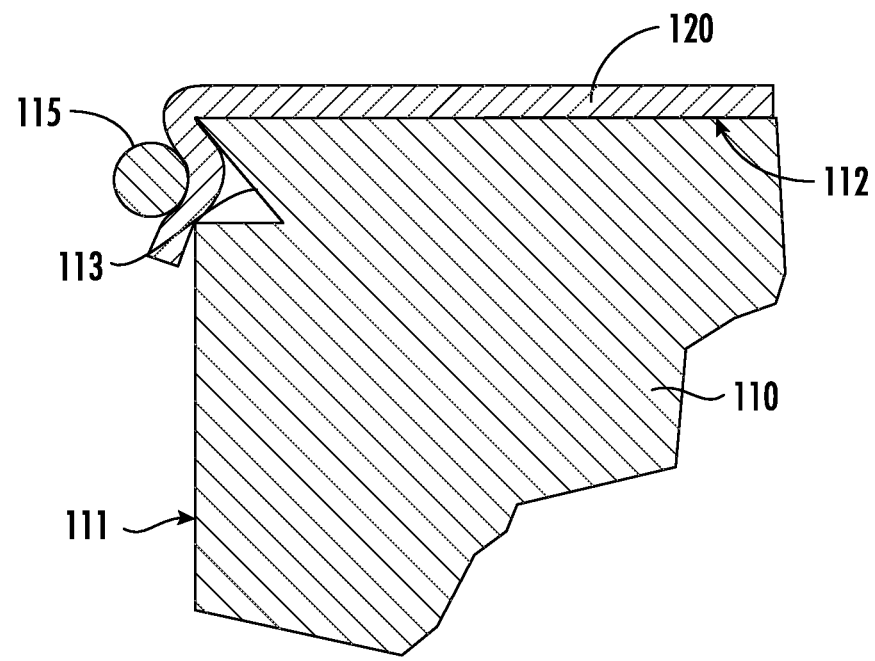
FIG. 23 is a sectional view of a portion of a centerbody showing an alternative configuration of mechanical sealing of a diaphragm.

FIG. 23 shows a control diaphragm 120 placed over the process surface 112 of the centerbody 110, with a portion of the control diaphragm 120 draped over a peripheral wall 111 of the centerbody 110. A dovetail-shaped peripheral groove 113 is formed in the peripheral wall 111. A resilient seal 115 such as the illustrated O-ring surrounds the control diaphragm 120 and forces it into the peripheral groove 113.

Figure 24:
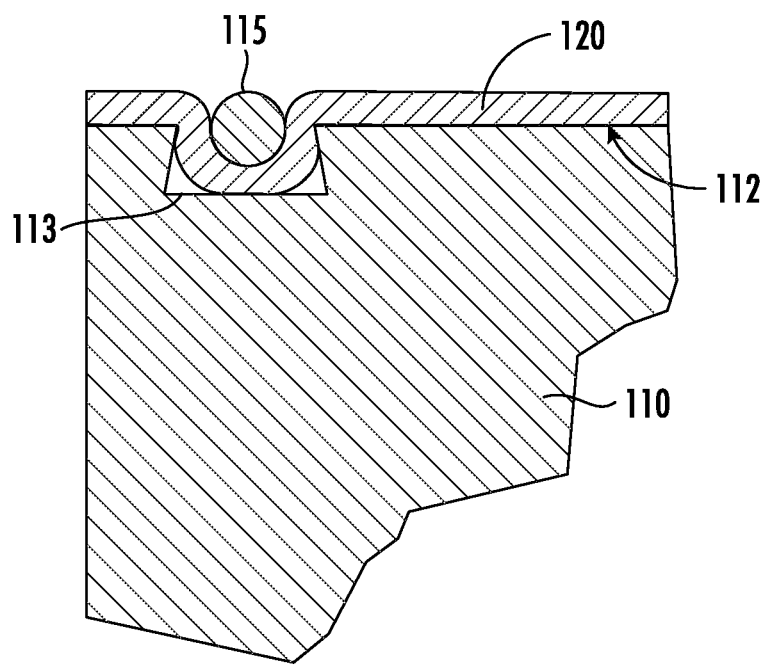
FIG. 24 is a sectional view of a portion of a centerbody showing an alternative configuration of mechanical sealing of a diaphragm.

FIG. 24 shows a control diaphragm 120 placed over the process surface 112 of the centerbody 110. A peripheral groove 113, such as a dovetail groove, is formed in the process surface 112. A resilient seal 115 such as the illustrated O-ring clamps the control diaphragm 120 into the peripheral groove 113.

Figure 25:
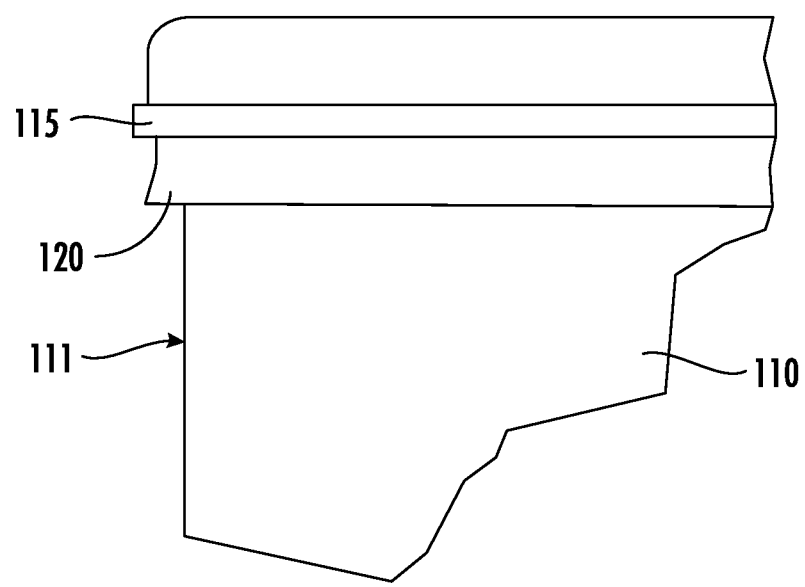
FIG. 25 is a sectional view of a portion of a centerbody showing an alternative configuration of mechanical sealing of a diaphragm.

FIG. 25 shows a control diaphragm 120 placed over the process surface of the centerbody 110. A retainer 115 clamps the control diaphragm 120 against the peripheral wall 111 of the centerbody 110. Nonlimiting examples of suitable retainers 115 include devices such as O-rings, elastic bands, "zip-ties", hose clamps, and similar devices. These exemplary methods and configurations for sealing are applicable to any of the diaphragm-to-centerbody connections described herein. The control diaphragm 120 is continuous and is free from holes or other openings therein, to form a fluid-tight boundary.

Referring back to FIGS. 1-5, in the illustrated example, the inlet orifices 116 and outlet orifices 118 are formed as through-holes, which must be sealed off at the back surface 114 in order to define the appropriate fluid flowpath. Accordingly, a backside diaphragm or membrane 122 is disposed adjacent the back surface 114. In one example, a thickness of the backside diaphragm 122 is less than 0.5 mm (0.02 inches). In another example it may be less than 0.25 mm (0.01 inches). The backside diaphragm 122 could be made from any of the materials listed for the control diaphragm 120. The perimeter of the backside diaphragm 122 is sealed to the centerbody 110. The backside diaphragm 122 includes an inlet opening 117 and an outlet opening 119.

In the illustrated example, separate inlet and outlet fittings 124, 126 respectively, are provided. Each of these has a flange 128 which is secured to the backside diaphragm 122, for example by welding or adhesive, to serve as inlet and outlet ports 130, 132 respectively, of the valve 100. A fluid passage 134 of the inlet fitting 124 communicates with the inlet opening 117 of the backside diaphragm 122, and a fluid passage 137 of the outlet fitting 126 communicates with the outlet opening 119 of the backside diaphragm 122. For best performance in a single-use application where sterility is important, the inlet and outlet fittings 124, 126 may be made of a USP class VI thermoplastic. Examples of such materials are described above.

Figure 11:
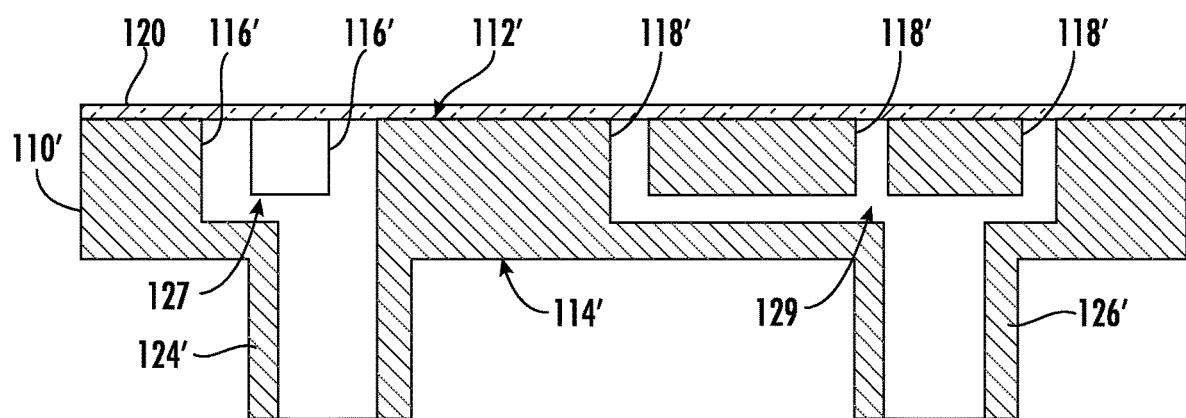
FIG. 11 is a cross-sectional view of an alternative centerbody for use of the valve of FIG. 1.

As an alternative construction, the centerbody may be constructed (for example using an additive manufacturing process) so as to include all necessary fluid passages, including a collection cavity where two or more outlet orifices are gathered together before exiting the valve through the outlet port. In a preferred embodiment, three or more orifices are gathered together in this cavity. For example, FIG. 11 illustrates a variation of a centerbody 110' including a process surface 112', an opposed back surface 114', a plurality of inlet orifices 116', a plurality of outlet orifices 118', an integral inlet fitting 124', and an integral outlet fitting 126'. An inlet manifold 127 is formed integrally with the centerbody 110' and forms a fluid connection between the inlet orifices 116' and the inlet fitting 124'. An outlet manifold 129 is formed integrally within the centerbody 110' and forms a fluid connection between the outlet orifices 118' and the outlet fitting 126'.

Referring back to FIG. 5, the control diaphragm 120 may be contained by any support structure that is strong enough to provide physical support for the control diaphragm 120 up to the intended use pressure. Nonlimiting examples of potential maximum pressures include: up to 70 kPa (10 psi), up to 400 kPa (60 psi), or up to 1000 kPa (150 psi). The support structure may be constructed so as to be reusable. For example, it may be made of a metal or metal alloy such as stainless steel. The support structure may be easily cleanable. In one example, the support structure has a surface finish of less than 32 RA (micro inch).

In the illustrated example, the enclosure assembly 104 includes top cap 106 which serves as a support structure for the control diaphragm 120. The top cap 106 has a disk-like shape with an internal reference cavity 136 and an integral reference port 138 connected in fluid communication with the reference cavity 136. It also includes a beveled first annular flange 140 around its periphery. Depending on the union method between diaphragm 120 and regulator body 112, the top cap 106 may also need an additional gasket 121 (FIG. 5) to appropriately apply additional compression to seal appropriately. This gasket 121 may be free-floating or mechanically bonded to the top cap 106 via glue, compression interlocking, or other geometry.

In similar fashion, the backside diaphragm 122 may be supported by reusable support structure to provide greater pressure rating while minimizing the quantity of single-use material. The configuration and material of the support structure for the backside diaphragm 122 may be similar to that of the support structure for the control diaphragm 120.

In the illustrated example, the enclosure assembly 104 includes bottom support 108 which serves as a support structure for the backside diaphragm 122. The bottom support 108 has a disk-like shape with clearance openings 142 for the inlet and outlet fittings 126 described above. It also includes a beveled second annular flange 144 around its periphery.

Means are provided for joining the components of the enclosure assembly 104 and to hold pressure forces. In the illustrated embodiment, seen in FIGS. 1-3 and FIG. 10, a ring-shaped clamp 146 incorporates a groove 148 which engages and clamps together the first and second annular flanges 140, 144. Another possible embodiment (not shown) would be a screwed retainer.

Figure 5:
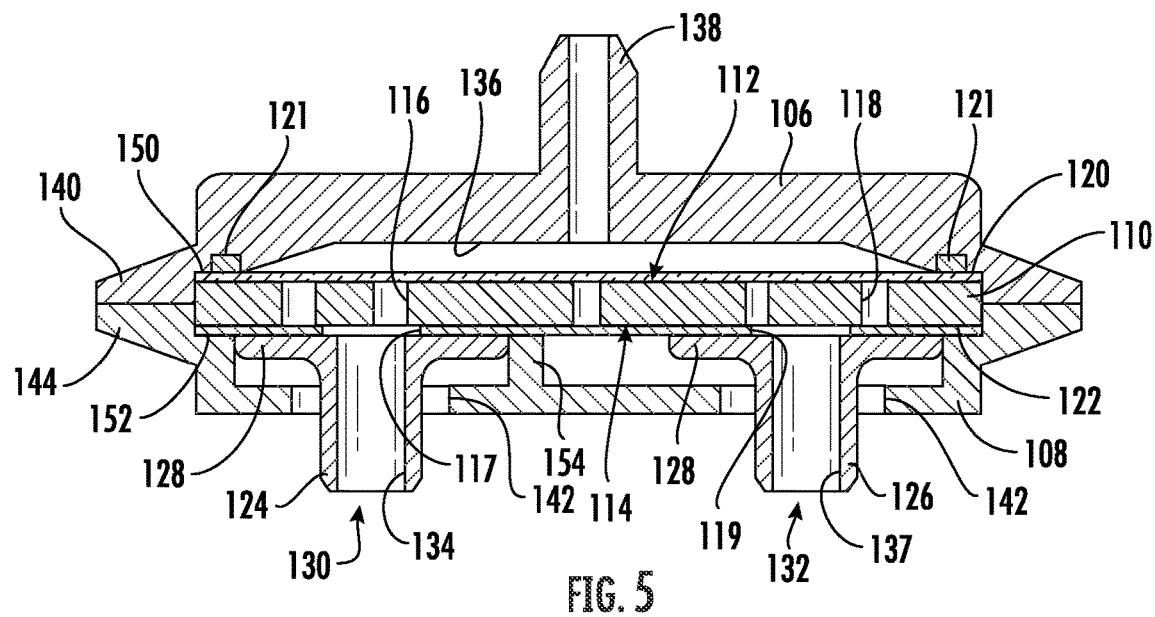
FIG. 5 is a cross-sectional view of the valve as shown in FIG. 4.
Figure 6:
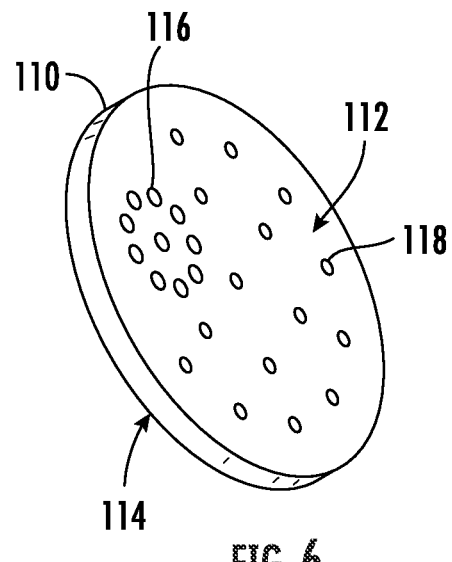
FIG. 6 is a perspective view showing a centerbody of the valve of FIG. 1.
Figure 7:
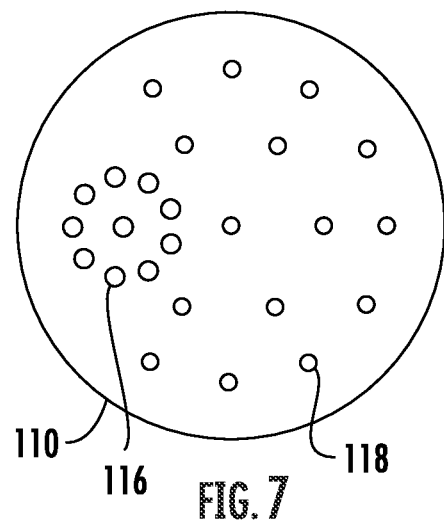
FIG. 7 is a top plan view of the centerbody of FIG. 6.
Figure 8:
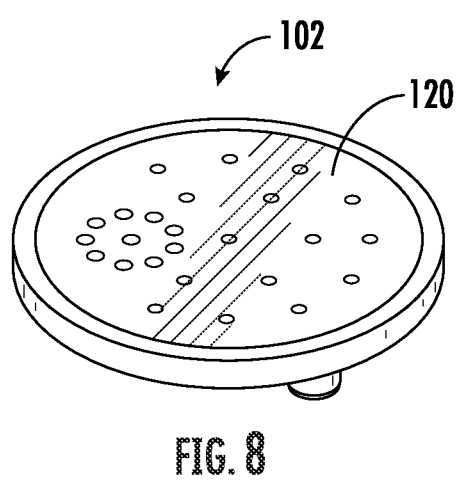
FIG. 8 is a top perspective view of a centerbody assembly incorporating the centerbody shown in FIG. 7.
Figure 10:
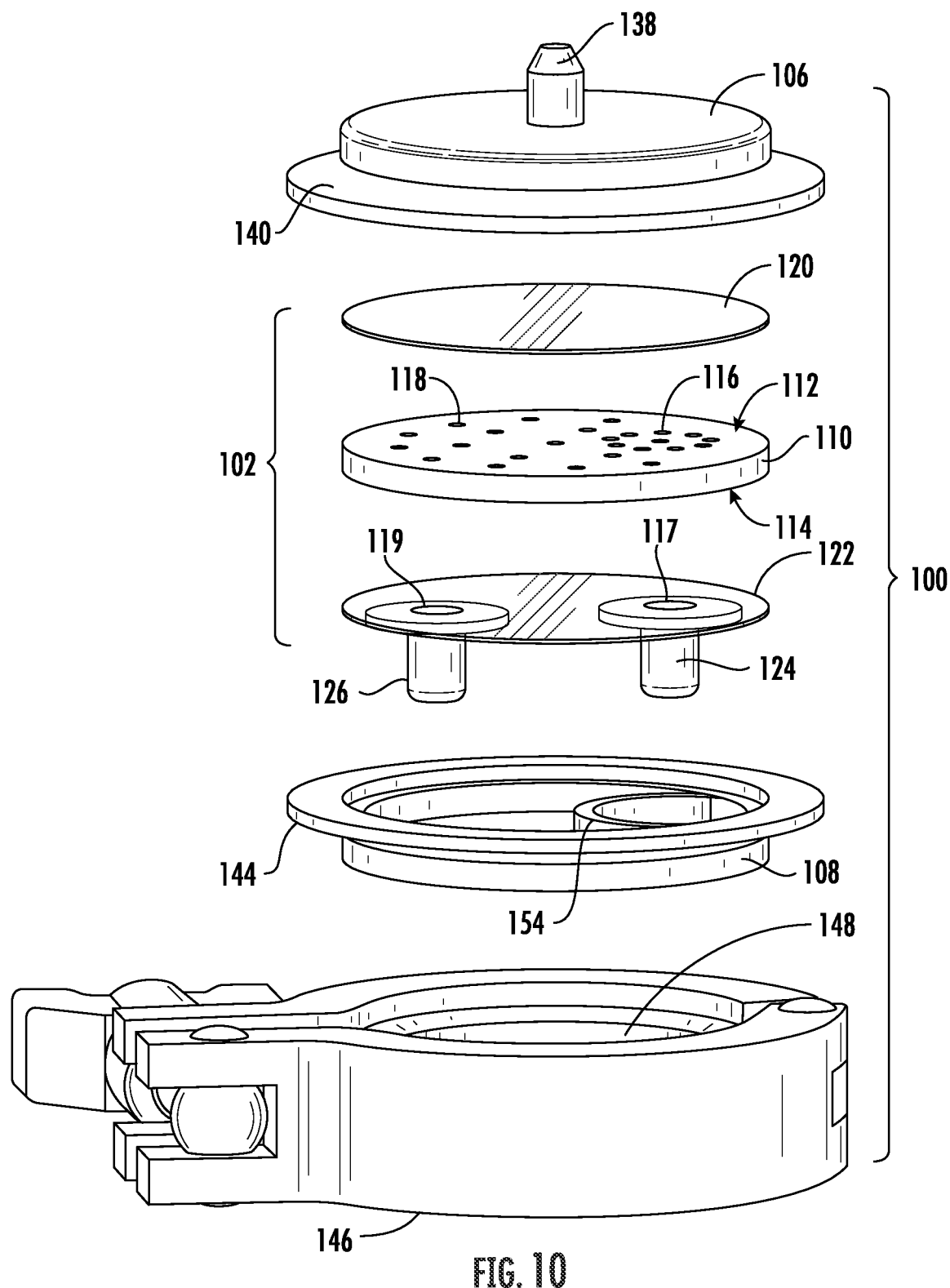
FIG. 10 is an exploded perspective view of the valve of FIG. 1.

Optionally, the support structure may provide reinforcement to the perimeter seal of the control diaphragm 120 and/or the backside diaphragm 122 by a crush seal configuration, allowing the centerbody assembly 102 to be rated to higher pressure than could be withstood by the single-use components alone. In the illustrated example, this crush seal is provided by clamping of selected portions of the centerbody assembly 102 between the top cap 106 and the bottom support 108. For example, as seen in FIG. 5, the top cap 106 and the bottom support 108 includes opposed rebates 150, 152 respectively, which receive a perimeter of the centerbody assembly 102 therebetween. As best seen in FIG. 10, the bottom support 108 further includes a rib 154 defining a closed perimeter which defines another crush seal that isolates the inlet fitting 124 from the outlet fitting 126.

An example of this construction would be a thin diaphragm that may be suitable for use at maximum pressures in a range of 14 kPa (2 psi) to 70 kPa (10 psi), considering normal safety factors of 3X to 5X relative to hydrostatic failure, without structure reinforcement. With the enclosure assembly 104 described above providing structural support of the perimeter bonds, the combination may be suitable for use up to 70 kPa (10 psi), up to 400 kPa (60 psi), or up to 1000 kPa (150 psi), or even higher pressures, again considering normal safety factors of 3X to 5X relative to hydrostatic failure.

Figure 12:
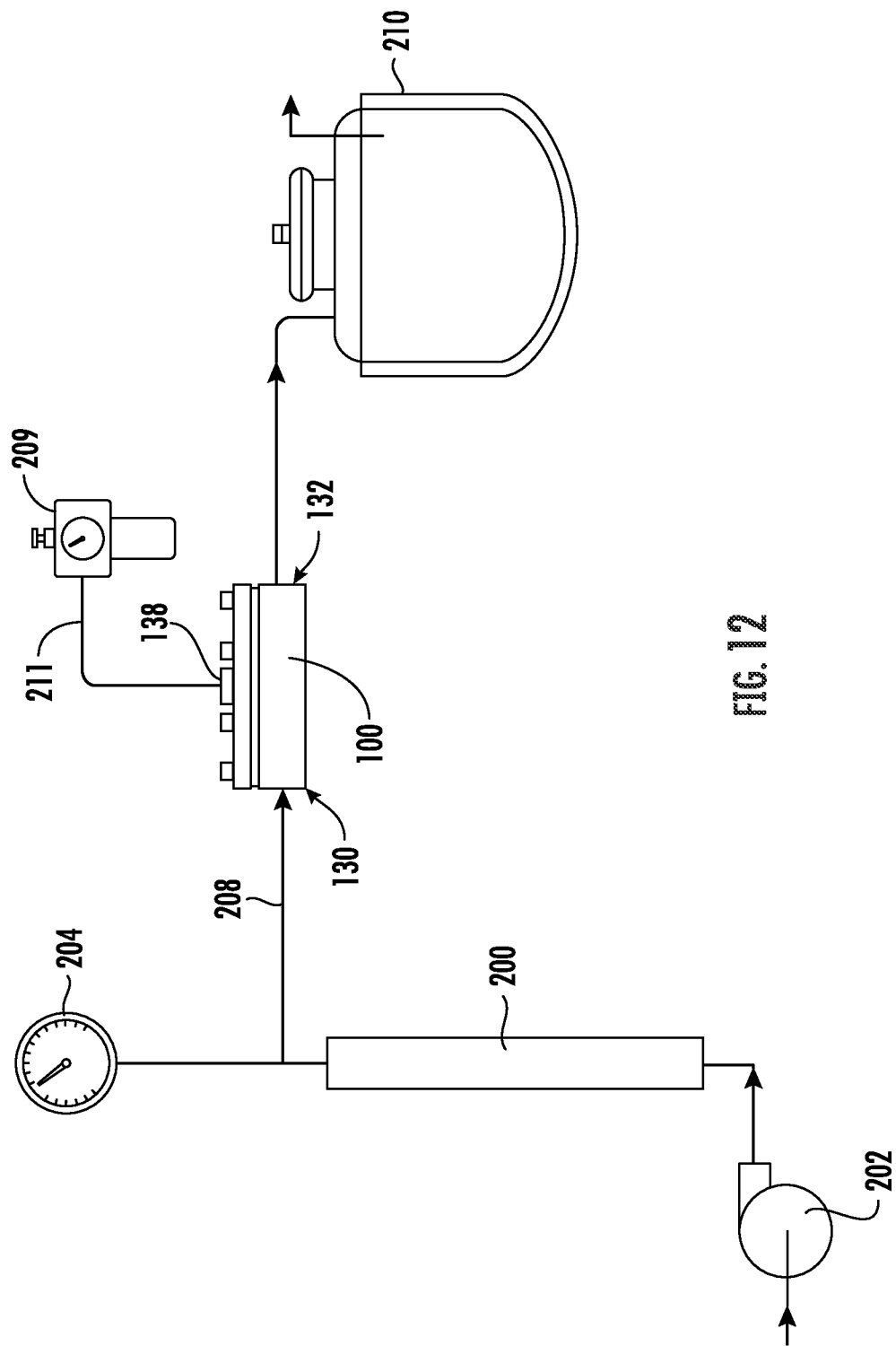
FIG. 12 is a flow diagram of the valve of FIG. 1 connected to a fluid system.
Figure 13:
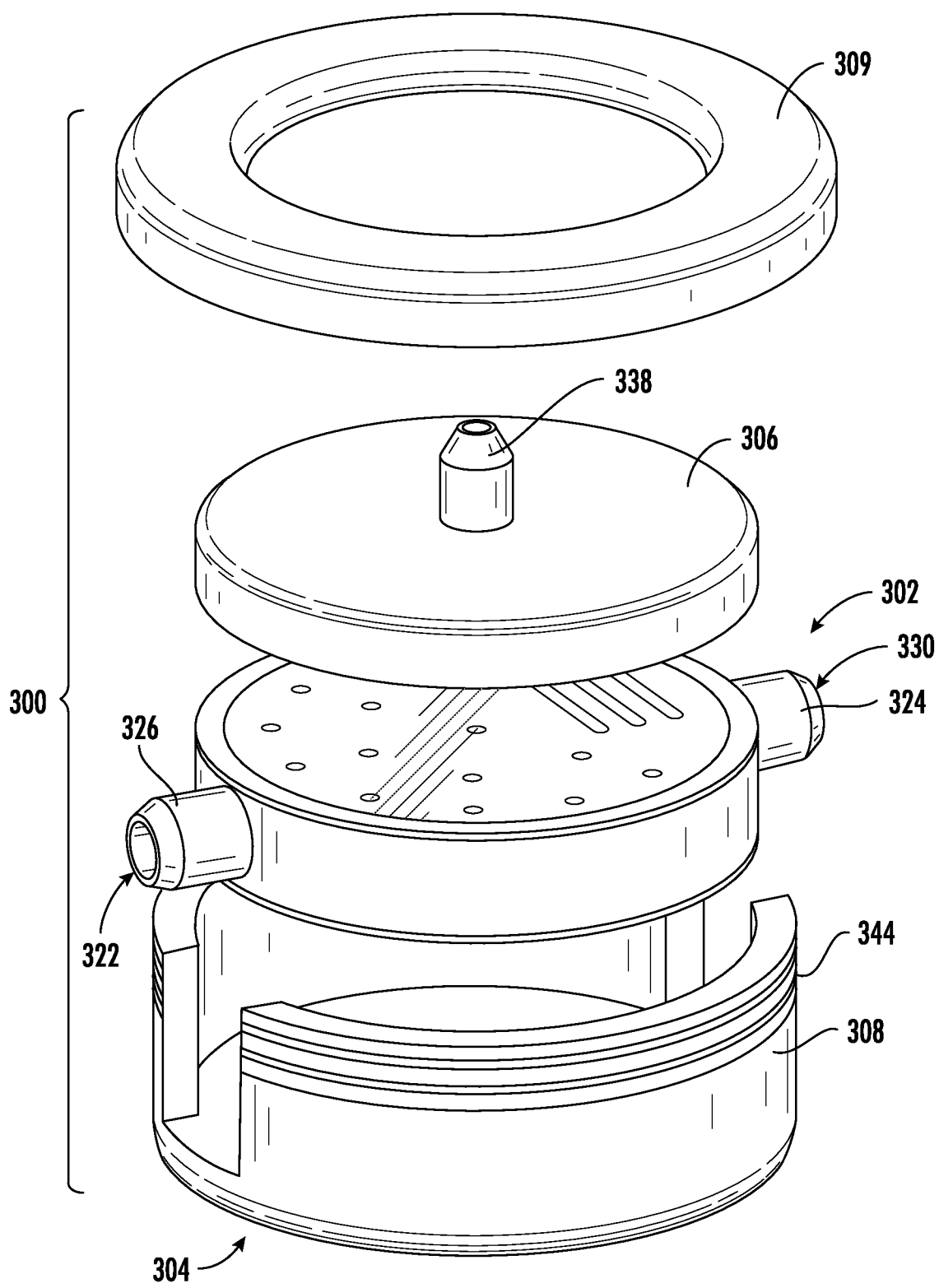
FIG. 13 is an exploded perspective view of an alternative embodiment of a valve.
Figure 14:
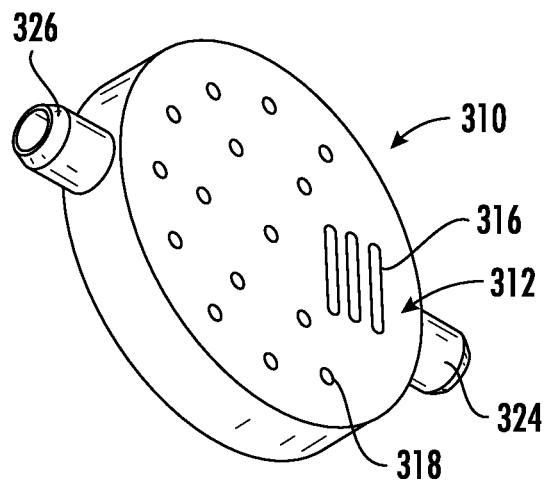
FIG. 14 is a top perspective view of a centerbody of the valve of FIG. 13.
Figure 15:
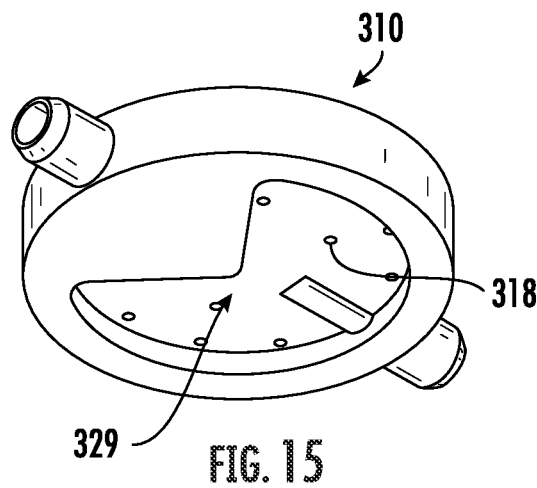
FIG. 15 is a bottom perspective view of the centerbody of FIG. 14.
Figure 16:
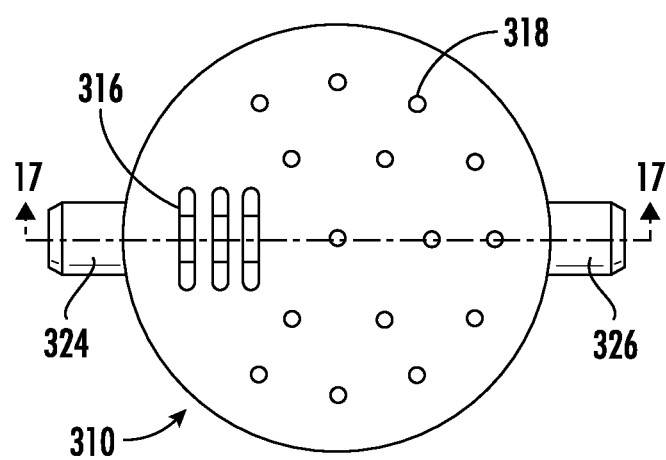
FIG. 16 is a top plan view of the centerbody of FIG. 14.
Figure 17:
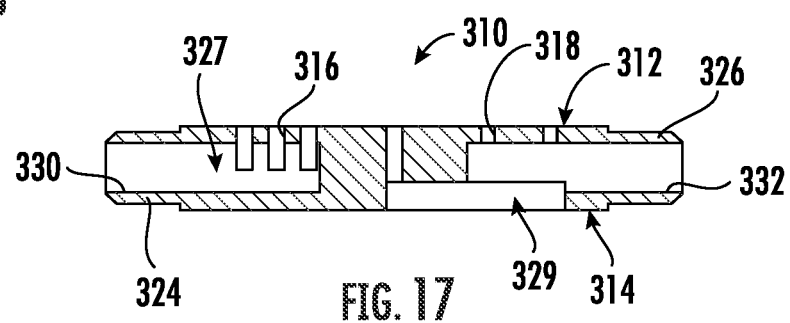
FIG. 17 is a sectional view taken along lines 17-17 of FIG. 16.

FIG. 12 is a schematic representation of a representative industrial process incorporating the valve 100 described above. This is but one of many types of process system which utilize a control valve and/or back pressure regulator. The system includes a process vessel 200 coupled to a compressor 202 and a pressure gauge 204. The process vessel 200 is connected to the inlet port 130 of the valve 100 by an inlet line 208. The reference port 138 of the valve 100 is connected to a pressure reference source 209 by a reference line 211. During normal balanced or modulating mode, the control diaphragm 120 is drawn into a sealing relationship with the outlet orifices 118 due to the pressure differential between the vessel pressure and reference pressure. When the vessel pressure exceeds the reference pressure the area of the control diaphragm 120 between the outlet orifices 118 is persuaded away from the outlet orifices 118 thereby allowing venting through the outlet port 132. In the illustrated example the outlet port 132 is coupled to a collection vessel 210. Optionally, the fluid may be discharged to atmosphere.

FIGS. 13-20 illustrate an alternative embodiment of a valve 300. The valve 300 is similar in overall construction to valve 100 described above and includes a centerbody assembly 302 and an enclosure assembly 304 including a top cap (or reference cap) 306, a bottom support 308, and a retainer ring 309.

The centerbody assembly 302 (FIGS. 14-19) includes a centerbody 310 having a first side defining a process surface 312, and an opposed second side defining a back surface 314. Both of the surfaces 312, 314 are generally planar in the illustrated example, but different geometries may be used for example, the surfaces 312, 314 may include various recesses or protrusions.

A plurality of inlet orifices 316 are formed in the centerbody 310 communicating with the process surface 312. A plurality of outlet orifices 318 are formed in the centerbody 310, separate from the inlet orifices 316, and also communicating with the process surface 312. The centerbody 310 includes an integral inlet fitting 324 defining an inlet port 330 of the valve 300, and an integral outlet fitting 326 defining an outlet port 332 of the valve 300. An inlet manifold 327 is formed integrally with the centerbody 310 and forms a fluid connection between the inlet orifices 316 and the inlet fitting 324. An outlet manifold 329 is formed integrally within the centerbody 310 and forms a fluid connection between the outlet orifices 318 and the outlet fitting 326. A portion of the outlet manifold 329 is open to the back surface 314.

The inlet and outlet fittings 324 and 326 may be functionally and/or structurally integral to the centerbody 310. In one example, the fittings 324, 326 may be formed as a physically unitary or integral part of the centerbody 310, for example by molding, additive manufacturing, or machining.

In another example, inlet and outlet fittings 324, 326 may be manufactured separately and then fit into the centerbody 310. Examples of suitable materials include metal alloys such as stainless steel, or thermoplastic materials. The fittings 324, 326 may be press fit into the centerbody 310, the interference providing a secure joint. In one exemplary combination, stainless steel barbs would be press fit into a thermoplastic centerbody 310 having a Shore D hardness greater than 55. For the most secure press fit, the Shore D hardness of the centerbody 310 may be greater than 70. Alternatively, the fittings 324, 326 could be bonded to the centerbody 310 using a process such as spin welding or ultrasonic welding (if both the centerbody 310 and the fittings 324, 326 are polymer).

The centerbody 310 (containing the orifices) may be manufactured using various methods such as machining from a block of precursor material, additive manufacturing processes (e.g., "3-D printing"), or molding from a polymer suitable for the application requirements. Examples of suitable materials are the same as described above for the centerbody 310.

A flexible control diaphragm or membrane 320, which may be substantially identical to the control diaphragm 120 described above, is provided. The control diaphragm 320 includes opposed sides referred to as reference and process sides and is disposed adjacent the process surface 312 with the process side facing the process surface 312. The perimeter of the control diaphragm 320 is sealed to the centerbody 110. The control diaphragm 320 is continuous and is free from holes or other openings therein, to form a fluid-tight boundary.

In the illustrated example, the outlet manifold 329 must be sealed off at the back surface 314 in order to define the appropriate fluid flowpath. Accordingly, a backside diaphragm or membrane 322 is disposed adjacent the back surface 314. The backside diaphragm 322 could be made from any of the materials listed for the control diaphragm 320. The perimeter of the backside diaphragm 322 is sealed to the centerbody 310.

The control diaphragm 320 and/or backside diaphragm 322 may be contained by any support structure that is strong enough to provide physical support for the control diaphragm 320. The configuration and material of the support structure may be similar to that of the support structure described above for valve 100, including, optionally a gasket (not shown) to enhance the seal around the periphery of one or both of the diaphragms 320, 322.

In the illustrated example, the enclosure assembly 304 includes a top cap 306, a bottom support 308, and a retainer ring 309. The top 306 has a disk-like shape with an internal reference cavity 336 and an integral reference port 338 connected in fluid communication with the reference cavity 336.

The bottom support 308 serves as a support structure for the backside diaphragm 322. The bottom support 308 has a disk-like shape with clearance slots 342 for the inlet and outlet fittings 324, 326 described above. It also includes threads 344 around its upper periphery.

Means are provided for joining the components of the enclosure assembly 304 and to hold pressure forces. In the illustrated embodiment, best seen in FIGS. 13 and 20, ring-shaped retainer 309 incorporates threads 348 which engages the threads 344 of the bottom support 308 to connect the top cap 306 and bottom support 308 with the centerbody 310 clamped therebetween.

Figure 21:
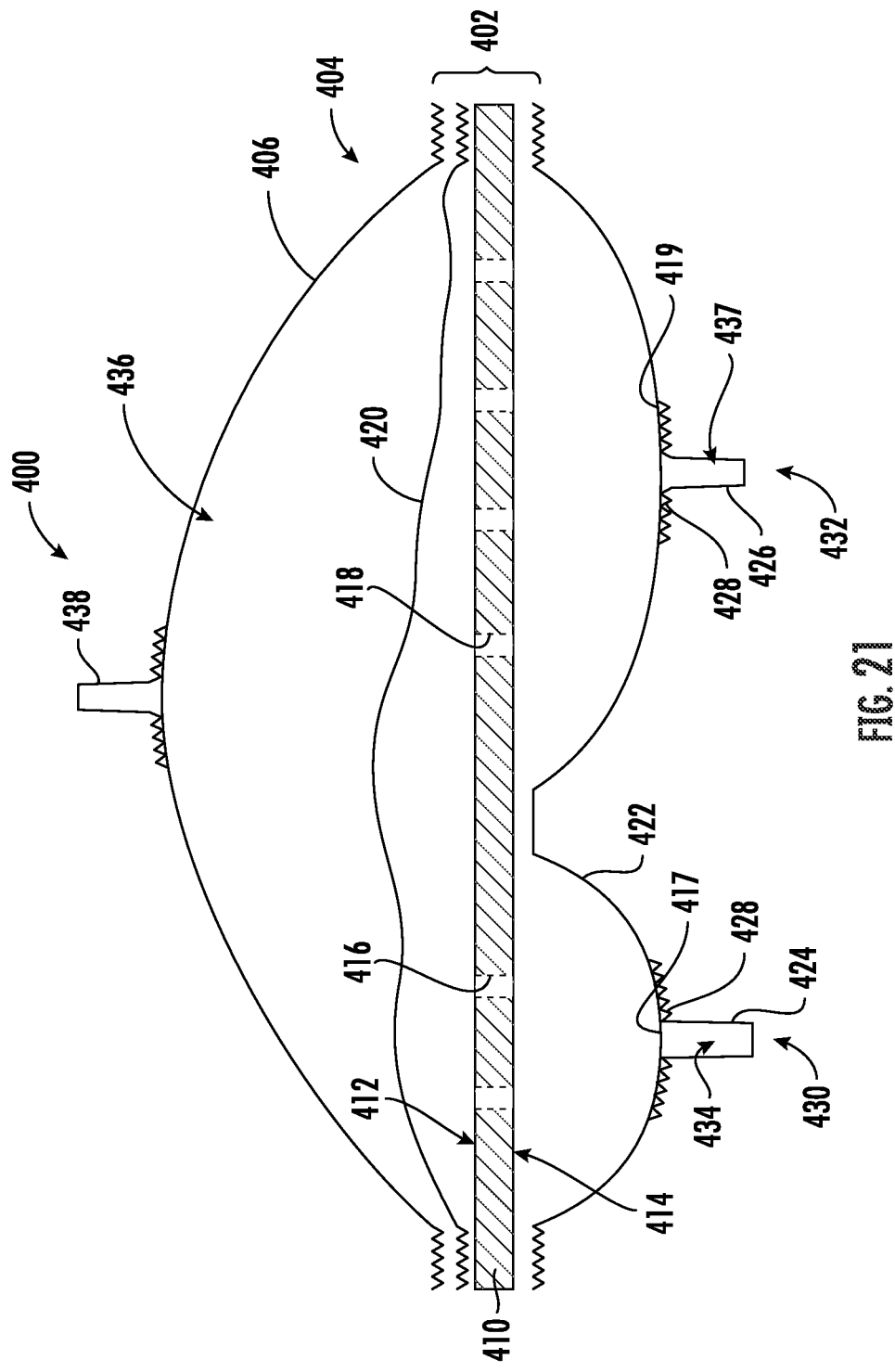
FIG. 21 is a schematic cross-sectional view of another embodiment of a valve.

FIG. 21 illustrates another alternative embodiment of a valve 400. The valve 400 is similar in construction to valve 100 described above and includes a centerbody assembly 402 and an enclosure 404 including a top cap (or reference cap) 406.

The centerbody assembly 402 includes a centerbody 410 having a first side defining a process surface 412, and an opposed second side defining a back surface 414. Both of the surfaces 412, 414 are generally planar in the illustrated example, but different geometries may be used, for example, the surfaces 412, 414 may include various recesses or protrusions.

At least one inlet orifice 416 passes through the centerbody 410 from the process surface 412 to the back surface 414. The function of the inlet orifice (or orifices) 416 is to bring the process fluid into the valve 400. At least one outlet orifice 418 passes through the centerbody 410 from the process surface 412 to the back surface 414.

The centerbody 410 (containing the orifices) may be manufactured using various methods such as machining from a block of precursor material, additive manufacturing processes (e.g., "3-D printing"), or molding from a polymer suitable for the application requirements. For best performance in a single-use application where sterility is important, a polymer with USP class VI certification may be used. Nonlimiting examples of such materials include polyolefin (e.g., polyethylene, LDPE, HDPE, UHMWPE), PEEK, acetal polymer (e.g. DELRIN), PTFE, and PFA.

A flexible control diaphragm or membrane 420 is disposed adjacent the process surface 412. For best performance in a single-use application where sterility is important, the control diaphragm 420 may be made from a material with USP class VI certification. Nonlimiting examples of such materials include TPU, TPE, polyolefin (LDPE, HDPE, UHMWPE, PP, etc.), PEEK, PTFE, PFA, FEP, a sulfone polymer such as RADEL, silicone, or other similar thermoplastic elastomer such as SANTOPRENE.

The control diaphragm 420 has opposed sides, referred to as reference and process sides, with the process side facing the process surface 412. The perimeter of the control diaphragm 420 is sealed to the centerbody 410, for example by welding or adhesive, to maintain sterility and also to serve as a pressure boundary in use. The control diaphragm 420 is continuous and is free from holes or other openings therein, to form a fluid-tight boundary.

In the illustrated example, the inlet orifices 416 and outlet orifices 418 are formed as through-holes, which must be sealed off at the back surface 414 in order to define the appropriate fluid flowpath. Accordingly, a backside diaphragm or membrane 422 is disposed adjacent the back surface 414. The backside diaphragm 422 could be made from any of the materials listed for the control diaphragm 420.

The perimeter of the backside diaphragm 422 is sealed to the centerbody 410, for example by welding or adhesive, to maintain sterility up to the point of final use and also to serve as a pressure boundary in use. Additional bond lines may be provided to separate the inlet orifices 416 from the outlet orifices 418 on the back surface 414. The backside diaphragm 422 includes an inlet opening 417 and an outlet opening 419 formed therein.

In the illustrated example, separate inlet and outlet fittings 424, 426 respectively, are provided. Each of these has a flange 428 which is secured to the backside diaphragm 422, for example by welding or adhesive, to serve as inlet and outlet ports 430, 432 respectively, of the valve 400. A fluid passage 434 of the inlet fitting 424 communicates with the inlet opening 417 of the backside diaphragm 422, and a fluid passage 437 of the outlet fitting 426 communicates with the outlet opening 419 of the backside diaphragm 422. For best performance in a single-use application where sterility is important, the inlet and outlet fittings 424, 426 may be made of a USP class VI thermoplastic. Examples of such materials are described above.

In the illustrated example, the enclosure assembly 404 includes top cap 406 which serves to enclose the control diaphragm 420. The top cap 406 has a disk-like shape and may be formed from the same material as the control diaphragm 420. It includes an integral reference port 438 connected in fluid communication with the space between itself and the control diaphragm 420, referred to herein as a reference cavity 436. The periphery of the top cap 406 is secured to the control diaphragm 420, the centerbody 410, or both, through means such as welding or adhesive.

In this embodiment, no rigid structures are provided on the outside of the diaphragms 420 and 422, making it especially economical and convenient as it minimizes the amount of material and can be completely discarded after a predetermined number of uses. The lack of rigid structures makes this embodiment generally more suitable for relatively low maximum pressures, for example, less than 70 kPa (10), or less than 35 kPa (5 PSI).

The valves described above has numerous advantages over prior art valves. They are of simple construction and are sufficiently economical that they can be considered single-use and/or disposal these valves have the capability to minimize disposal waste of valve materials. They present few wetted materials in their construction. They may be made from materials that can be sterilized and are compatible with biochemical processes such as USP class VI certified and BPA-free polymers The foregoing has described an apparatus for single-use valves. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A centerbody assembly for a valve, comprising:
   a centerbody having a process surface, at least one inlet orifice disposed in the centerbody and adapted to be disposed in fluid communication with a fluid at a process pressure, and at least one outlet orifice disposed in the centerbody separate from the at least one inlet orifice;
   an inlet port disposed in fluid communication with the at least one inlet orifice;
   an outlet port disposed in fluid communication with the at least one outlet orifice; and wherein:
   the centerbody includes a back surface opposite the process surface, an integral inlet fitting extending from the back surface, and an integral outlet fitting extending from the back surface;
   an inlet manifold is formed integrally with the centerbody and forms a fluid connection between the at least one inlet orifice and the inlet fitting; and
   an outlet manifold is formed integrally within the centerbody and forms a fluid connection between the at least one outlet orifice and the outlet fitting; and
   a flexible control diaphragm facing the process surface, wherein a perimeter of the flexible control diaphragm is bonded to the centerbody so as to define a seal that blocks the passage of fluid.

2. The centerbody assembly of claim 1 wherein the centerbody comprises a polymer.

3. The centerbody assembly of claim 2 wherein the flexible control diaphragm comprises a polymer.

4. The centerbody assembly of claim 3 wherein the periphery of the flexible control diaphragm is bonded to the centerbody with a thermal bond.

5. A centerbody assembly for a valve, comprising:
   a centerbody having a process surface, at least one inlet orifice disposed in the centerbody and adapted to be disposed in fluid communication with a fluid at a process pressure, and at least one outlet orifice disposed in the centerbody separate from the at least one inlet orifice;
   an inlet port disposed in fluid communication with the at least one inlet orifice;
   an outlet port disposed in fluid communication with the at least one outlet orifice; and
   a flexible control diaphragm facing the process surface, wherein a perimeter of the flexible control diaphragm is bonded to the centerbody so as to define a seal that blocks the passage of fluid;
   wherein:
   the centerbody includes a back surface opposite the process surface; and
   a flexible backside diaphragm is bonded to the back surface of the centerbody; and
   further comprising separate inlet and outlet fittings extending from the flexible backside diaphragm.

6. A valve, comprising:
a centerbody assembly including:
- a centerbody having a process surface, at least one inlet orifice disposed in the centerbody and adapted to be disposed in fluid communication with a fluid at a process pressure, and at least one outlet orifice disposed in the centerbody separate from the at least one inlet orifice;
- a flexible control diaphragm positioned facing the process surface, wherein a perimeter of the flexible control diaphragm is bonded to the centerbody so as to define a seal that blocks the passage of fluid;
- an inlet port disposed in fluid communication with the at least one inlet orifice; and
- an outlet port disposed in fluid communication with the at least one outlet orifice;

wherein the centerbody includes a back surface opposite the process surface, an integral inlet fitting extending from the back surface, and an integral outlet fitting extending from the back surface;
- an inlet manifold is formed integrally with the centerbody and forms a fluid connection between the at least one inlet orifice and the inlet fitting; and
- an outlet manifold is formed integrally within the centerbody and forms a fluid connection between the at least one outlet orifice and the outlet fitting; and
- an enclosure assembly including a top cap adapted to be disposed in fluid communication with a fluid at a predetermined reference pressure, wherein the flexible control diaphragm is positioned between the centerbody and the top cap, and arranged such that, when the reference pressure is higher than the process pressure the flexible control diaphragm is engaged with the at least one outlet orifice, and when the process pressure is higher than the reference pressure, the flexible control diaphragm is not engaged with the at least one outlet orifice.

7. The valve of claim 6 wherein the centerbody comprises a polymer.

8. The valve of claim 7 wherein the flexible control diaphragm comprises a polymer.

9. The valve of claim 8 wherein the periphery of the flexible control diaphragm is bonded to the centerbody with a thermal bond.

10. A valve, comprising:
a centerbody assembly including:
- a centerbody having a process surface, at least one inlet orifice disposed in the centerbody and adapted to be disposed in fluid communication with a fluid at a process pressure, and at least one outlet orifice disposed in the centerbody separate from the at least one inlet orifice;
- a flexible control diaphragm positioned facing the process surface, wherein a perimeter of the flexible control diaphragm is bonded to the centerbody so as to define a seal that blocks the passage of fluid;
- an inlet port disposed in fluid communication with the at least one inlet orifice; and
- an outlet port disposed in fluid communication with the at least one outlet orifice; and
- an enclosure assembly including a top cap adapted to be disposed in fluid communication with a fluid at a predetermined reference pressure, wherein the flexible control diaphragm is positioned between the centerbody and the top cap, and arranged such that, when the reference pressure is higher than the process pressure the flexible control diaphragm is engaged with the at least one outlet orifice, and when the process pressure is higher than the reference pressure, the flexible control diaphragm is not engaged with the at least one outlet orifice, wherein:

the centerbody includes a back surface opposite the process surface;
a flexible backside diaphragm is bonded to the back surface of the centerbody; and
the enclosure assembly includes a bottom support, wherein the flexible backside diaphragm is positioned between the centerbody and the bottom support; and
further comprising separate inlet and outlet fittings extending from the flexible backside diaphragm.

11. The valve of claim 10 wherein the centerbody assembly comprises a polymer and the enclosure assembly comprises a metal alloy.

12. A valve, comprising:
a centerbody having a process surface and an opposed back surface, at least one inlet orifice passing through the centerbody from the process surface to the back surface, and at least one outlet orifice passing through the centerbody from the process surface to the back surface;
a flexible control diaphragm disposed adjacent the process surface, wherein a perimeter of the flexible control diaphragm is bonded to the centerbody so as to define a seal that blocks the passage of fluid;
a flexible backside diaphragm disposed adjacent the back surface, wherein a perimeter of the flexible backside diaphragm is bonded to the centerbody so as to define a seal that blocks the passage of fluid, the flexible backside diaphragm further being bonded to the back surface so as to separate the inlet orifices from the outlet orifices on the back surface, and wherein the flexible backside diaphragm includes an inlet opening and an outlet opening; and
a top cap enclosing the flexible control diaphragm, wherein a periphery of the top cap is bonded to at least one of the flexible control diaphragm and the centerbody, and the top cap includes a reference port connected in fluid communication with a reference cavity defined between the top cap and the flexible control diaphragm.

* * * * *